US009466149B2

(12) United States Patent
Jones et al.

(10) Patent No.: US 9,466,149 B2
(45) Date of Patent: Oct. 11, 2016

(54) LIGHTING OF GRAPHICAL OBJECTS BASED ON ENVIRONMENTAL CONDITIONS

(71) Applicant: GOOGLE INC., Mountain View, CA (US)

(72) Inventors: Jonah Jones, San Francisco, CA (US); Ram Brijesh Jagadeesan, Mountain View, CA (US)

(73) Assignee: GOOGLE INC., Mountain View, CA (US)

( * ) Notice: Subject to any disclaimer, the term of this patent is extended or adjusted under 35 U.S.C. 154(b) by 343 days.

(21) Appl. No.: 13/891,860

(22) Filed: May 10, 2013

(65) Prior Publication Data

US 2015/0187128 A1 Jul. 2, 2015

(51) Int. Cl.
*G06T 15/60* (2006.01)
*G06T 15/50* (2011.01)
*G06T 19/20* (2011.01)

(52) U.S. Cl.
CPC .............. *G06T 15/60* (2013.01); *G06T 15/506* (2013.01); *G06T 19/20* (2013.01); *G06T 2215/16* (2013.01)

(58) Field of Classification Search
None
See application file for complete search history.

(56) References Cited

U.S. PATENT DOCUMENTS

| | | | |
|---|---|---|---|
| 2008/0211813 A1* | 9/2008 | Jamwal et al. | 345/426 |
| 2010/0066750 A1* | 3/2010 | Yu et al. | 345/581 |
| 2013/0141434 A1* | 6/2013 | Sugden | G02B 27/017 345/426 |
| 2014/0210822 A1* | 7/2014 | Raley | 345/426 |

OTHER PUBLICATIONS

Apple Maps iOS (2013). Retrieved from the Internet on Aug. 8, 2013: URL:http://www.apple.com/ios/maps/.
Bing Maps (2013). Retrieved from the Internet on Aug. 8, 2013: URL:http://www.bing.com/maps/.
CNET, "3D Web Hits the Big Time: Google Maps on WebGL," (2011). Retrieved from the Internet on Aug. 8, 2013: URL:http://news.cnet.com/8301-30685 3-20119878-264/3d-web-hits-the-big-time-google-maps-on-webgl/.
esri,"Free Mapping Software," (2013). Retrieved from the Internet on Aug. 8, 2013: URL:http://www.esri.com/software/free-mapping-software.
Mapquest (2013). Retrieved from the Internet on Aug. 8, 2013: URL:http://www.mapquest.com/.
Microsoft, "Information for Real-World Pilots: An Aid for Training and Proficiency," (2009). Retrieved from the Internet on Aug. 8, 2013: URL:http://www.microsoft.com/Products/Games/FSInsider/product/Pages/InfoRealworld.aspx.
Nokia Maps (2013). Retrieved from the Internet on Aug. 8, 2013: URL:http://here.com/41.8779999,-79.7148437,5.0,0,normal.day.
OpenStreetMap (2013). Retrieved from the Internet on Aug. 8, 2013: URL:http://www.openstreetmap.org/#map=5/51.481/-0.110.
Yahoo Maps (2013). Retrieved from the Internet: URL:http://maps.yahoo.com/.

* cited by examiner

*Primary Examiner* — Maurice L McDowell, Jr.
(74) *Attorney, Agent, or Firm* — Marshall, Gerstein & Borun LLP (57) ABSTRACT

To provide digital maps on a portable device, a graphical representation of an object is displayed for display on a digital map, current orientation of the portable device relative to the sun is determined, and orientation of the graphical representation of the object relative to a virtual sun is determined based on the determined current orientation of the portable device relative to the sun. Using the virtual sun as a light source, a shadow cast by the graphical representation is generated for display on the digital map.

18 Claims, 9 Drawing Sheets

LIGHTING OF GRAPHICAL OBJECTS BASED ON ENVIRONMENTAL CONDITIONS

FIELD OF TECHNOLOGY

The present disclosure relates to graphical user interfaces on portable devices and, more particularly, to providing realistic lighting to graphical objects in accordance with the real-world environment of the portable device.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Many current computing devices, including portable devices, support software applications for displaying two-dimensional (2D) and three-dimensional (3D) digital maps that include graphical representations of various types of objects. For example, a digital map may include various types of markers, icons, structures and geographic data such as topographical data, street data, urban transit information, and traffic data. Further, the geographic data may be schematic or based on photography, such as satellite imagery.

Some of these applications simulate lighting effects by shading 3D representations of buildings using shadow mapping. To this end, the applications simulate the presence of a virtual light source in a certain fixed position.

SUMMARY

To provide a rich, immersive experience to a user of a portable device such as a smartphone, a software lighting module displays graphical objects and applies lighting to these objects in accordance with the orientation of the portable device relative to the real-world sun. In particular, the lighting module generates shadows for the graphical objects as if these objects were positioned in the real-world environment of the user rather than in a virtual world. To this end, the lighting module determines the current position of the sun in the sky based on the current location of the portable device, the time, and the date, for example. This technique also can be understood as alignment of a virtual light source, residing in the virtual world of graphical objects, with the real-world light source. Moreover, the alignment of the virtual light source with the real-world light source can be implemented in real time, so that when the user rotates the portable device while holding it approximately in parallel to the ground (in other words, changes the pitch of the portable device), the lighting module re-generates the shadows to match the new orientation of the graphical objects relative to the real-world sun. Further, the lighting module can adjust the shadows in accordance with the yah and/or roll of the portable device. Still further, in addition to the position of the sun, the lighting module in some implementations also adjusts lighting in view of other environmental conditions such as humidity, temperature, and cloudiness.

More specifically, one embodiment of the techniques of the present disclosure is a method for providing realistic digital maps on a portable device. The method includes generating a graphical representation of an object for display on a digital map, determining a current orientation of the portable device relative to the real-world sun, determining an orientation of the graphical representation relative to a virtual sun based on the determined current orientation of the portable device relative to the real-world sun, and generating, using the virtual sun as a light source, a shadow cast by the graphical representation for display on the digital map.

Another embodiment of the techniques of the present disclosure is a computer-readable medium storing instructions. When executed on one or more processors, the instructions cause the one or more processors to determine a current orientation of a portable device relative to a real-world light source and generate a digital map including graphical representations of objects for display on the portable device. To generate the digital map, the instructions cause the one or more processors to apply lighting to the graphical representations in accordance with the current orientation of the portable device relative to the real-world light source to generate an effect of the digital map being lit by the real-world light source.

Still another embodiment of the techniques of the present disclosure is a portable device including a display device, one or more processors, and a computer-readable memory storing instructions. When executed on the one or more processors, the instructions cause the portable device to determine orientation of the portable device relative to the real-world sun, wherein the orientation is associated with six degrees of freedom (6 DOF), generate a digital map depicting objects for display on the display device, and generate lighting effects for the digital map for display on the display device according to the orientation of the computing device relative to the real-world sun, whereby the digital map appears to be lit by the real-world sun.

BRIEF DESCRIPTION OF THE DRAWINGS

FIGS. 5A-9B illustrate example application of lighting techniques of the present disclosure to various graphical objects displayed on a digital map on a portable device, in accordance with different orientations of the portable device relative to the real-world sun; in particular:

DETAILED DESCRIPTION

A lighting software module ("lighting module") operating on a portable device applies realistic lighting to graphical objects displayed on the screen in accordance with the current orientation of the portable device relative to the real-world sun. In an example implementation, the lighting module operates in a software application that displays an interactive digital map to a user. The lighting module provides immersive and aesthetically pleasing lighting effects, so that the digital map appears to be lit by the ambient light in the user's physical environment. For example, the lighting module may depict certain elements of the digital map as casting shadows and/or reflecting glare as if the lighting within the virtual space of the map elements were provided by the real-world sun (rather than by a light virtual source fixed in a certain position in the virtual space of these map elements). The lighting module may respond to changes in the orientation of the portable device in real time, so that when the portable device is tilted, for example, the shadows change to match the new orientation of objects on the digital map relative to the real-world sun.

As a more specific example, if the sun is directly west of the user and she is viewing a digital map on a portable device with map-north aligned with true-north, the lighting module will generate shadows cast east relative to the displayed objects (as well as true-east relative to the user's physical environment). If the user then rotates the portable device 90 degrees east so that map-north aligns with true-east, the lighting module generates shadows cast map-north relative to the displayed objects, even though map-north now corresponds to true-east. In other words, the displayed objects will appear to be casting shadows in the direction of true-east, as if the virtual light source for the digital map were the real-world sun in the user's physical environment.

In some implementations, the lighting module can further enhance the immersive user experience by adjusting the lighting in view of other environmental conditions, such as current weather at the location of the portable device. For example, the lighting module can adjust the density of shadows depending on whether the sky is clear or overcast.

These techniques are discussed in more detail below with reference to FIGS. 1-9b. In particular, an example system in which these techniques can be implemented is first described with reference to FIG. 1. Example methods which the lighting module may implement to provide lighting effects are described with reference to FIGS. 2-4. Example lighting effects which the lighting module may provide are discussed with reference to FIGS. 5a-9b. Although the examples below relate primarily on digital maps, it is noted that the techniques of the present disclosure are also applicable to other types of graphical objects and software applications that display graphical objects.

System Overview

Figure 1:
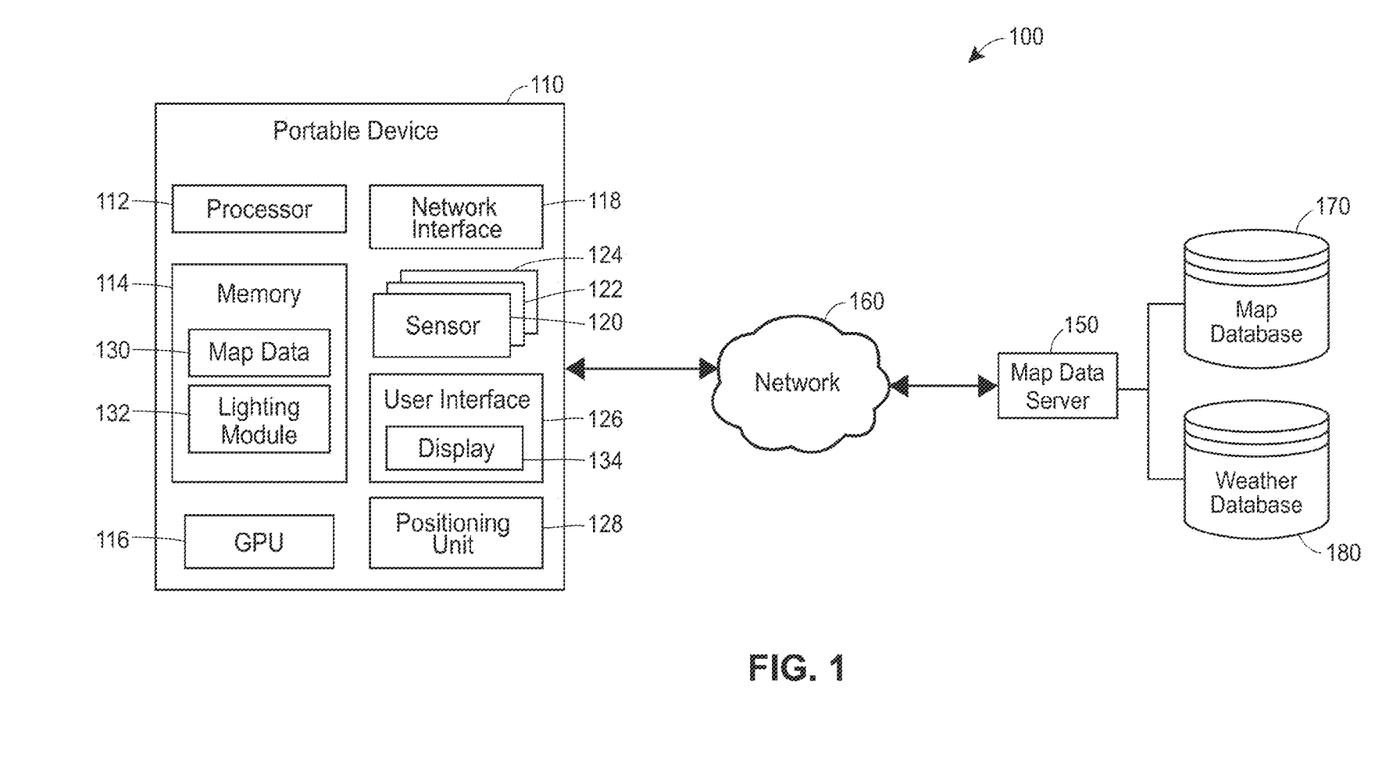
FIG. 1 illustrates an example system in which the lighting techniques of the present disclosure can be implemented.

Referring first to FIG. 1, a system 100 includes a portable device 110, which can be a smartphone, a tablet computer, a handheld navigation device, etc. The portable device 110 can include one or more processors 112, a computer-readable memory 114, a graphics processing unit (GPU) 116, a network interface 118, several sensors such as sensors 120, 122, and 124, a user interface (UI) 126, and a positioning unit 128 such as a Global Positioning System (GPS) chip. The UI 126 in this example includes a display 134. More generally, the UI 126 can include any suitable input and output devices, such as a touchscreen, a keyboard, a mouse, and speakers.

The memory 114 can include persistent (e.g., a hard disk) and/or non-persistent (e.g., RAM) components. The memory 114 stores map data 130 and instructions that make up a lighting module 132. In operation, the processor 112 fetches and executes the instructions. The memory 114 also can store instructions of a software application (not shown) in which the lighting module 132 operates, which similarly are executable on the processor 112. Depending on the implementation, this software application can be a mapping application specifically configured to generate interactive digital maps, a web browser that executes mapping application programming interface (API) functions, etc. Further, in various implementations, the lighting module 132 and the software application can include compiled instructions, instructions that are interpreted at runtime, etc.

The portable device 110 is configured to communicate with a map data server 150 via a communication network 160, which can include any suitable number of wired and/or wireless communication links. The map data server 150 in turn communicates with a map database 170 that stores map data for generating interactive digital maps and a weather database 180 from which the map data server 150 can retrieve weather data for a specified geographic area. Depending on the implementation, the weather database 180 and the map database 170 are operated together or separately.

The sensors 120-124 in various implementations of the portable device 110 can include sensors for determining position of the portable device 110, characteristics of motion of the portable device 110 (e.g., speed, acceleration), orientation of the portable device 110, amount of light intensity, temperature, etc. In general, the portable device 110 may include more or fewer sensors. Examples of the sensors 120-124 include an inertial measurement unit (IMU), an accelerometer, a gyroscope, a gravity sensor, a magnetometer, a proximity sensor, a photometer. Some of the sensors 120-124 may allow the processor 112 to measure the six degrees of freedom of the portable device 110. For example, the processor 112 can use the sensors 120-124 to determine the azimuth/yaw, pitch, and roll of the portable device 110. As discussed in more detail below, the lighting module 132 may utilize orientation and position data of the portable device 110 to determine how lighting effects should be applied to a digital map.

In operation, the portable device 110 receives the map data 130 from the map data server 150 via the network interface 118. In an example scenario, the portable device 110 sends a request that specifies the geographic area, the zoom level, and the map type to the map data server 150. The map data server 150 in response retrieves the map data 130 from the map database 170 and provides the map data 130 to the portable device 110.

The map data 130 in general includes data that specifies graphical elements of a digital map. For example, the map data 130 may separately specify map elements representing roads, parks, bodies of water, external walls of buildings, and other natural and artificial objects visible outside, e.g., from above or at a street level. In one example scenario, the map data 130 conforms to a vector graphics format and specifies 2D shapes along with colors, textures, etc. to be applied to these shapes. In another example scenario, the map data 130 includes 3D mesh descriptions of buildings along with photographic imagery for texturing the corresponding 3D meshes. In yet another scenario, the map data 130 includes both 2D and 3D map data. For example, the map data 130 can include 2D map data and low-detail 3D outlines of buildings for rendering over the 2D map. Map data may also include text-based data for displaying various labels such as street names or names of landmarks.

The software application in which the lighting module 132 operates interprets and renders the map data 130 to generate a digital map for display via the user interface 126.

When the user changes the zoom level, pans across the map, selects a different map type (e.g., traffic map, terrain map), or otherwise interacts with the digital map, the software application re-renders the map data 130 to generate an updated digital map.

When the software application renders the map data 130, the lighting module 132 uses some or all of (i) time and date information, (ii) positioning data generated by the positioning unit 128, (iii) sensor data from the sensors 120-124, and (iv) weather data received from the weather database 180 to determine the current orientation of the portable device 110 relative to the sun and to generate shadows and other lighting effects for objects depicted as part of the digital map. In some implementations, the portable device 110 determines current position of the sun by using a certain network service (e.g., by transmitting a query specifying the current position of the portable device 110 to a certain network device, and receiving an indication of the current position of the sun in the sky).

Example Methods for Applying Lighting to Graphical Objects

Figure 2:
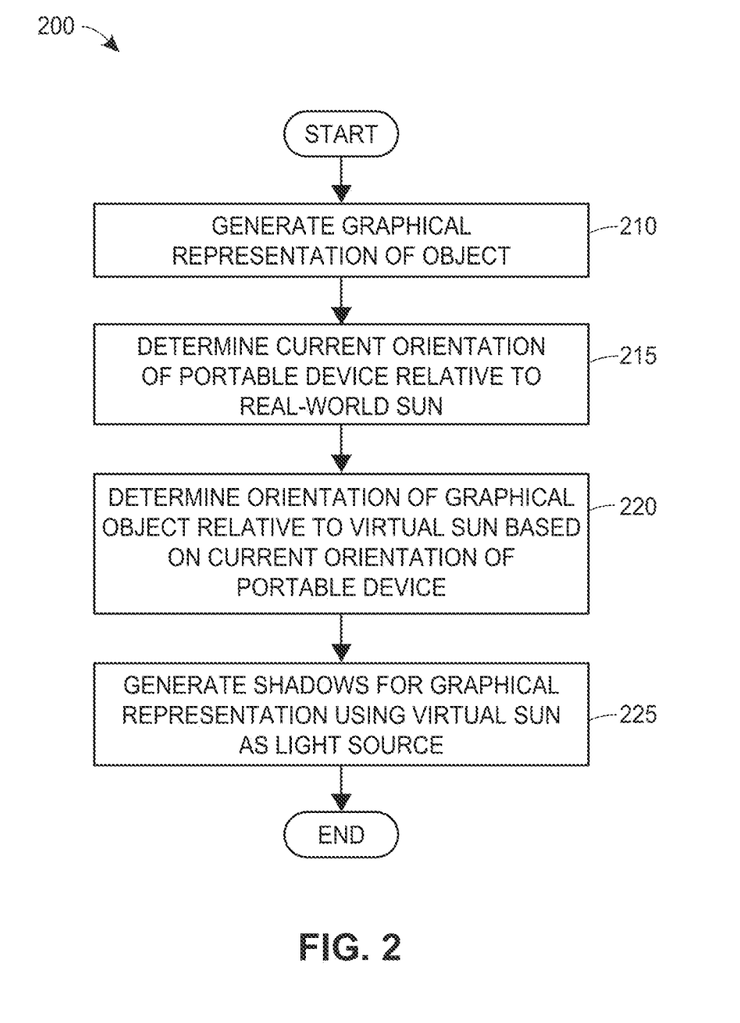
FIG. 2 is a flow diagram of an example method for generating shadows of a graphical object, which can be implemented in the system of FIG. 1.

FIG. 2 illustrates an example method 200 for applying realistic lighting to a graphical object using the real-world sun as the virtual light source in the virtual space of the graphical object. The method 200 may be implemented, in whole or in part, in one or more devices or systems such as those illustrated in FIG. 1, for example. In particular, the method 200 may be implemented as a set of instructions stored on a computer-readable memory (such as the memory 114) and executable by one or more processors. As a more specific example, some or all of the blocks 210-225 can be implemented in the lighting module 132.

The method 200 is discussed below with reference to digital maps. However, this method generally can be applied to any graphical object such as an icon displayed on a virtual desktop, a 3D digital model (e.g., a model of a vehicle, an airplane, a piece of furniture), stylized text, video game characters, etc.

In an example application to digital maps, the method 200 begins when a graphical representation of an object is generated for display on a digital map (block 210). The graphical representation and the digital map may be displayed via the display 134 of FIG. 1, for example. The object can be building, a terrain feature, an icon, or any other object which may be represented in a digital map environment. As illustrated below, the graphical representation of the object can be three-dimensional or two-dimensional (in which case the graphical representation and the digital map are disposed on different planes to make shadows visible).

Current orientation of the portable device relative to the real-world sun is determined at block 215. The current orientation in this example implementation corresponds to the angle at which sunlight falls on the surface of the screen of the portable device. The position of the sun in the sky can be reliably determined for a particular location given a particular time and date, for example. Thus, in one implementation, the location of the portable device is determined first using GPS, Wi-Fi triangulation, or any other suitable technique. The position of the sun in the sky then is determined based on the determined location, the current time, and the current date. To this end, an almanac listing the position of the sun for various locations and various times can be stored in the portable device or on a network device, for example. In any case, at block 215, the position of the sun can be determined as a set of angles the line-of-sight (LOS) to the sun forms with certain x-axis, y-axis, and z-axis, or in any other suitable format. Further, sensor data can be used to determine the orientation of the portable device relative to these axes. Finally, these calculations can be used to determine the orientation of the portable device relative to the sun.

In an alternative implementation of block 215, however, the current orientation can be determined in view of the pitch of the portable device (i.e., the direction in which the portable device is facing) but not view of the roll or yaw of the portable device. According to this implementation, the shadows are not affected by the user tilting the portable device.

At block 220, the orientation of a graphical object relative to a virtual light source, such as a virtual sun, is determined based on the current orientation of the portable device relative to the real-world sun. Generally speaking, the orientation of graphical objects on the portable device relative to some axes in the physical world of the user depends on the orientation of the portable device relative to these axis. For example, for the default view of the virtual camera, the vertical axis of 3D representations of buildings is perpendicular to the surface of the screen. For another orientation of the virtual camera, the vertical axis of 3D representations of buildings may not be perpendicular to the surface of the screen, but in any case the orientation of these representations is related to the orientation of the portable device.

With continued reference to block 220, the virtual sun can be aligned with the real-world sun, so that the virtual sun simulates the real-world sun. In other words, the portable device positions the virtual sun so that the orientation of the graphical representation relative to the virtual sun is the same as the orientation of the graphical representation relative to the real-world sun.

Next, shadows are generated for the graphical representations of objects using the virtual sun as a light source (block 225). In particular, executing block 225 may involve determining whether the virtual light source is visible from various points on the digital map, and shading the digital map at areas where the virtual light source is blocked by the graphical representations.

Figure 3:
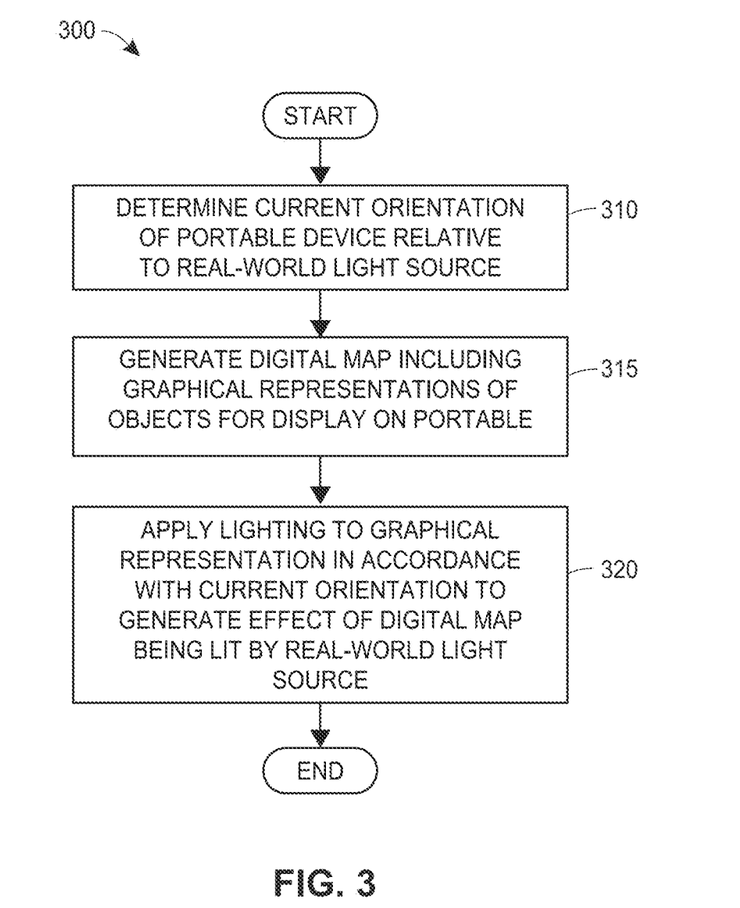
FIG. 3 is a flow diagram of an example method for generating a digital map with realistic lighting, which also can be implemented in the system of FIG. 1.

FIG. 3 is a flow diagram of an example method 300 for generating a digital map with realistic lighting of objects displayed over, or as a part of, the digital map. The method 300 may be implemented in a portable device as a set of instructions stored on a computer-readable medium (e.g., the memory 114 of FIG. 1) and executable on one or more processors (e.g., the processor 112). As one example, the method 300 can be implemented in the lighting module 132. Alternatively, the method 300 can be partially or fully implemented in a network server.

The method 300 begins when current orientation of the portable device relative to a real-world light source is determined at block 310. A digital map including graphical representations of objects is generated for display on the portable device (block 315). The graphical representations can correspond to various physical entities disposed in the geographic area represented by the digital map: buildings, natural formations, other structures, etc. Further, the graphical representations also can correspond to navigation controls such as pan or zoom buttons, icons indicating points of interest, location markers representing the user's current location, etc. If desired, some or all text labels also can be generated as graphical representations of objects and lit according to the techniques of the present disclosure.

At block 320, lighting is applied to the graphical representations of objects in accordance with the current orientation of the portable device relative to the real-world light source so as to generate an effect of the digital map being lit by the real-world light source. To this end, the techniques discussed above with reference to FIG. 2 can be used.

Figure 4:
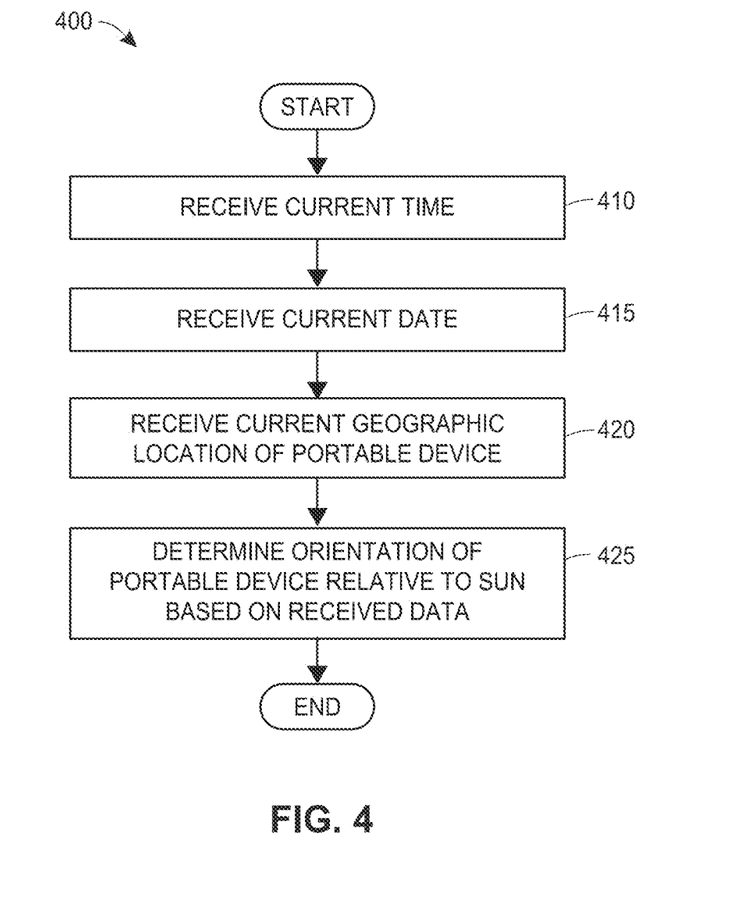
FIG. 4 is a flow diagram of an example method for determining orientation of a portable relative to the sun, which can be implemented in the system of FIG. 1.

Now referring to FIG. 4, a method 400 for determining an orientation of a portable device relative to the sun can be implemented, for example, in the portable device 110 depicted in FIG. 1. Similar to the methods discussed above, the method 400 can be implemented as a set of instructions executable on or more processors.

The method 400 begins when the current time is determined (block 410). The current date is received at block 415, and the current geographic location of the portable device is determined at block 420. Based on the received data, the orientation of the portable device relative to the sun is determined at block 425.

Accounting for Other Environmental Factors

In some embodiments of the lighting module 132 (or a similar software component), determines other light parameters such as light temperature, light intensity, etc. and adjusts the lighting of the geographical objects accordingly. Referring back to FIG. 1, the portable device 110 can receive weather parameters from the weather database 180 and determine whether the sky is overcast at the current location of the portable device 110, whether it is raining, whether there is a fog that affects the lighting, etc. The lighting module 132 can adjust the lighting accordingly and make the colors warmer or colder, make the shadows thicker or thinner, etc.

Alternatively or additionally to using data from the weather database 180, the portable device can use data from some of the sensors 120-124. For example, the sensors 120-124 can measure light intensity, humidity, temperature, etc.

These adjustments to lighting can be implemented at block 225 of the method 200 or at block 320 of the method 300, for example.

Examples of Applying Lighting in View of Environmental Conditions

For further clarity, FIGS. 5A-9B illustrate several example applications of the lighting techniques of the present disclosure to graphical objects displayed on digital maps. In an example implementation, the lightning module 132 depicted in FIG. 1 generates some or all of the graphical objects of FIGS. 5A-9B, in various scenarios. More generally, the graphical objects of FIGS. 5A-9B can be generated by any suitable software module that implements one or more of the methods 200, 300, or 400 discussed above.

Figure 5A:
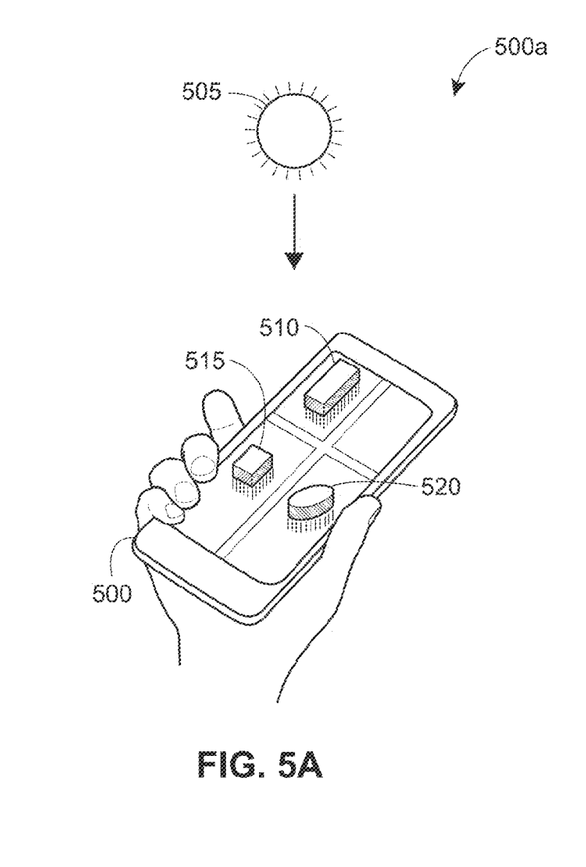
FIGS. 5A and 5B illustrate shadows generated for three-dimensional (3D) representations of buildings.
Figure 5B:
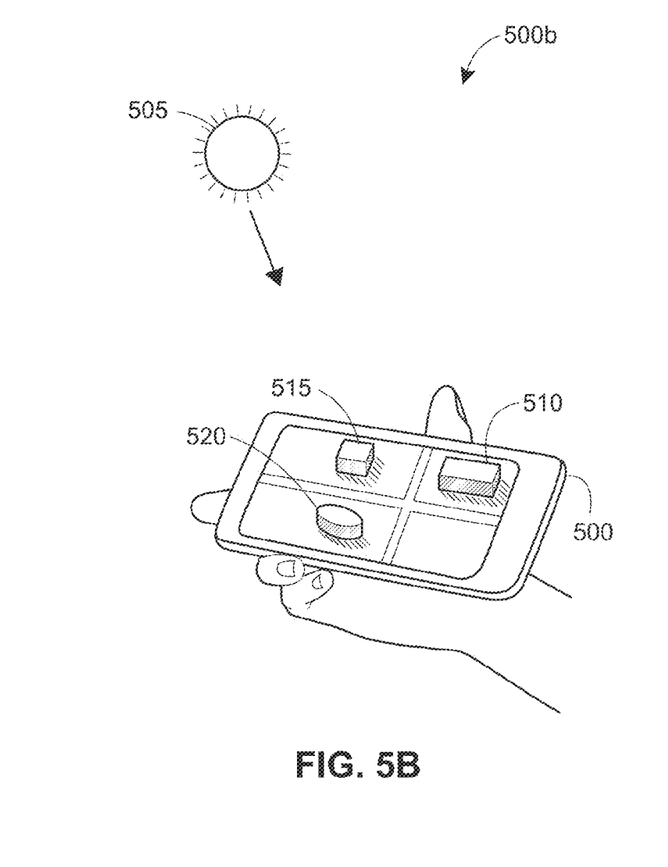

FIGS. 5a and 5b illustrate an orientation 500a and an orientation 500b, respectively, of a portable device 500 relative to the real-world sun 505. Orientation 500b differs from the orientation 500a by approximately 90 degrees. The portable device 500 displays a 3D digital map that includes a graphical representation 510 of a first building, a graphical representation 515 of a second building, and a graphical representation 520 of a third building. The shading of the graphical objects 510-520 creates the effect of the (virtual) light source of the digital map environment being the same as, or at least being aligned with, the real-world sun 505. In other words, the direction and size of the shadows cast by the graphical representations 510-520 is determined according to the position of the real-world sun 505 and current orientation of the portable device 500. To put it in yet another way, from the perspective of the user of the portable device, the shadows appear to be cast in a consistent direction relative to the real-world sun 505, regardless of the orientation of the portable device.

As discussed above, in other implementations, the angle between the real-world sun 505 and the surface of the display of the portable device 500 may also affect how lighting effects are provided for the digital map displayed on the portable device 500. For example, when the portable device 500 is oriented so that the display is facing up (i.e., parallel to the x-y plane of the world's frame of reference) and the real-world sun 505 is above the display of the portable device 500 (e.g., around noon), the portable device 500 may display small shadows. On the other hand, when the portable device 500 is oriented so that the display is facing up and the real-world sun 505 is positioned close to the horizon (e.g., at around dusk or dawn), the portable device 500 may display large shadows.

Figure 6A:
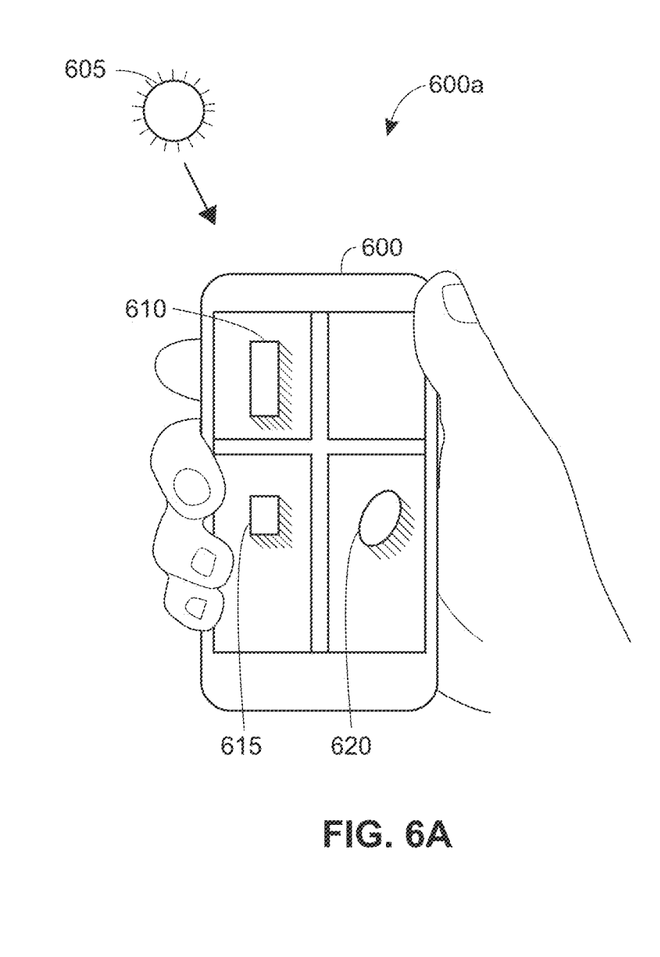
FIGS. 6A and 6B illustrate shadows generated for two-dimensional (2D) representations of buildings.
Figure 6B:
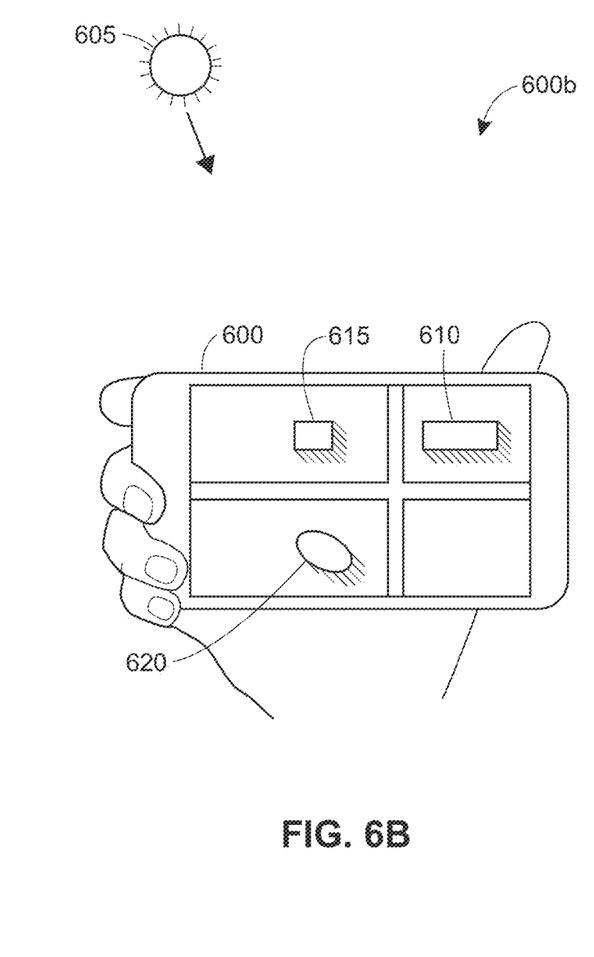

FIGS. 6a and 6b illustrate an orientation 600a and an orientation 600b, relative to a real-world sun 605, of a portable device 600 displaying a 2D digital map. FIGS. 6a and 6b show similar features to those illustrated in FIGS. 5a and 5b, with the digital map of FIGS. 6a and 6b being 2D rather than 3D. The orientation 600b of the portable device 600 differs from the orientation 600a by 90 degrees. The 2D digital map displayed by the portable device 600 includes 2D graphical representations of buildings 610, 615, and 620 on a plane parallel to, but distinct from, the plane of the 2D digital map.

Figure 7A:
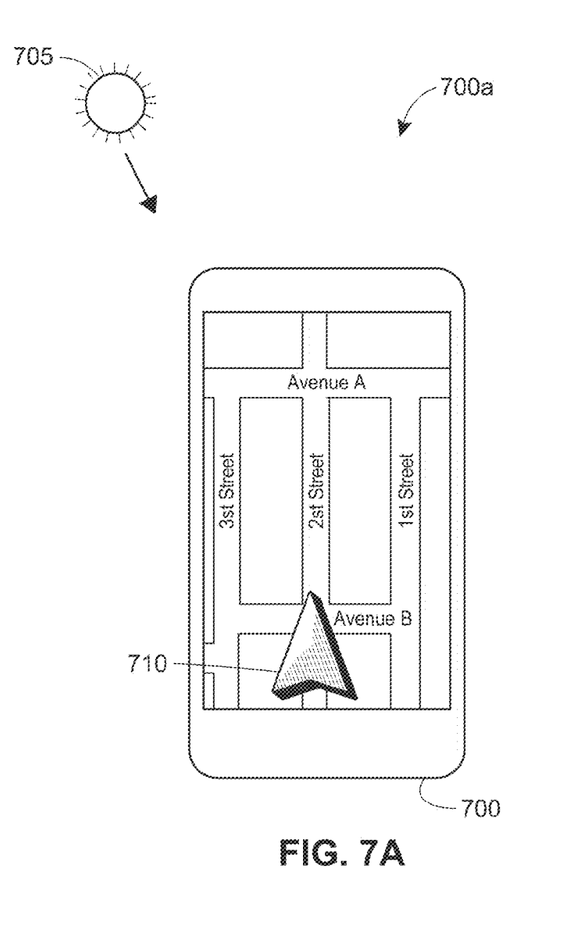
FIGS. 7A and 7B illustrate shadows generated for a 3D icon.
Figure 7B:
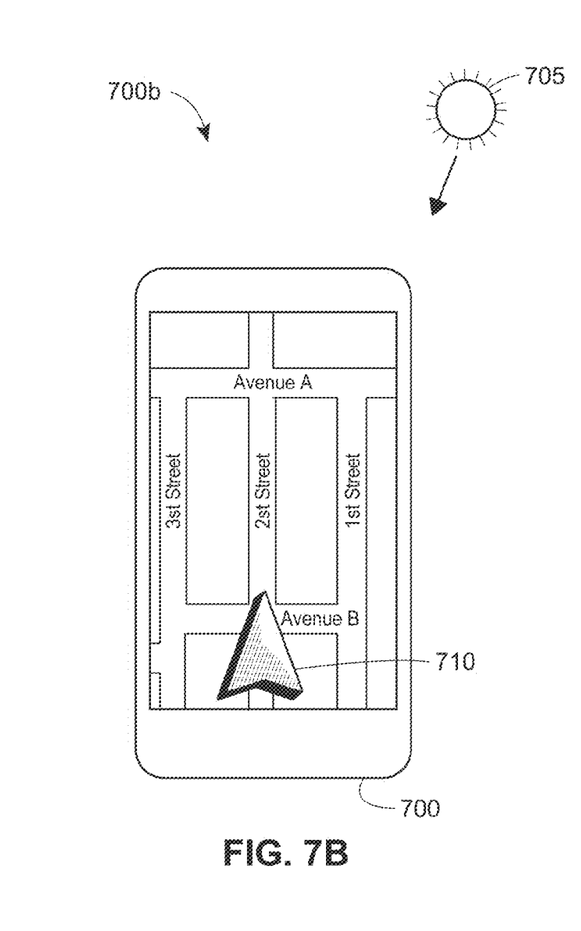

Further, FIGS. 7a and 7b illustrate an orientation 700a and an orientation 700b, relative to a real-world sun 705, of a portable device 700 displaying a 3D icon 710. In FIG. 7a, real-world sun 705 is positioned north-west of the portable device 700. In FIG. 7b, the real-world sun 705 is positioned north-east of the portable device 700. The shadows cast by icon reflect the position of the real-world sun 705 relative to orientation of the portable device 700 and the displayed icon 710.

Figure 8A:
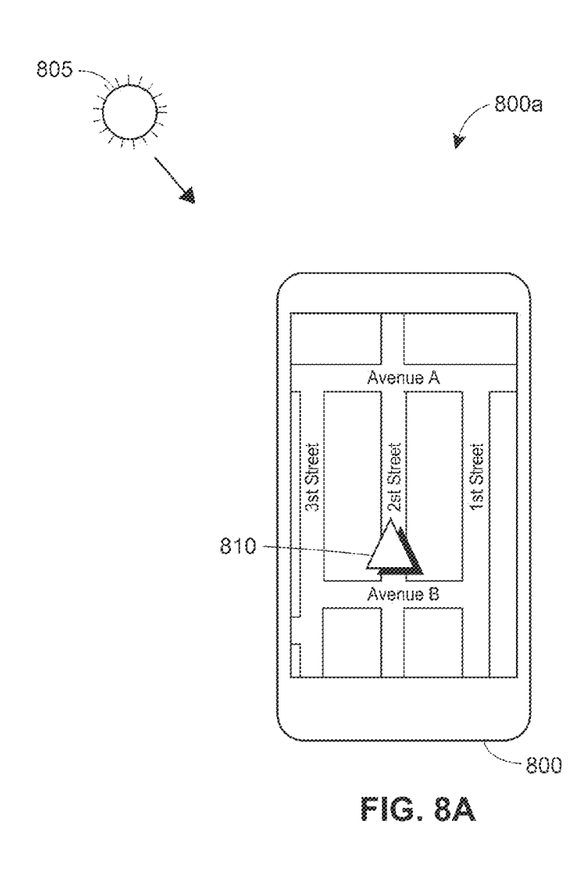
FIGS. 8A and 8B illustrate shadows generated for a 2D icon disposed on a plane above the plane of the digital map.
Figure 8B:
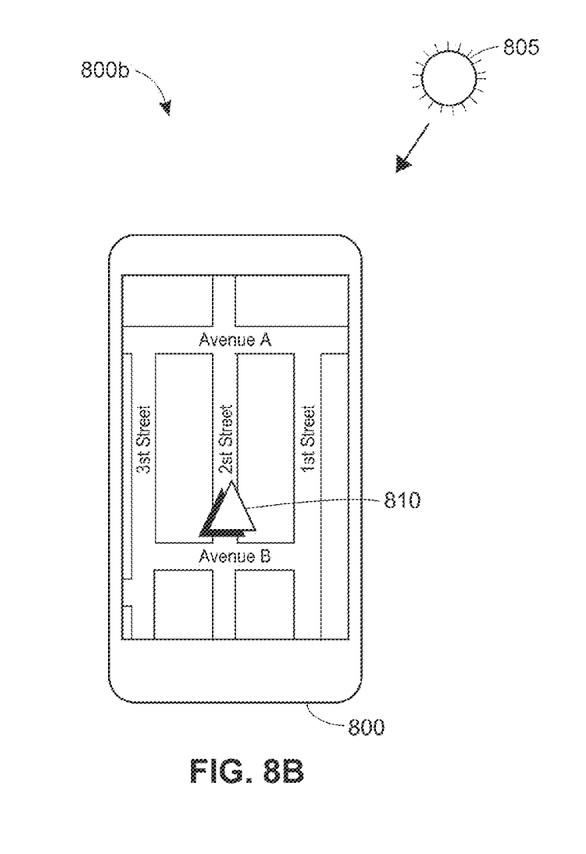

FIGS. 8a and 8b illustrate an orientation 800a and an orientation 800b, relative to a real-world sun 805, of a portable device 800 displaying a 2d icon 810. In both FIGS. 8a and 8b, the 2D icon is displayed on a 3D digital map, "hovering" over the surface of the 3D digital map.

Figure 9A:
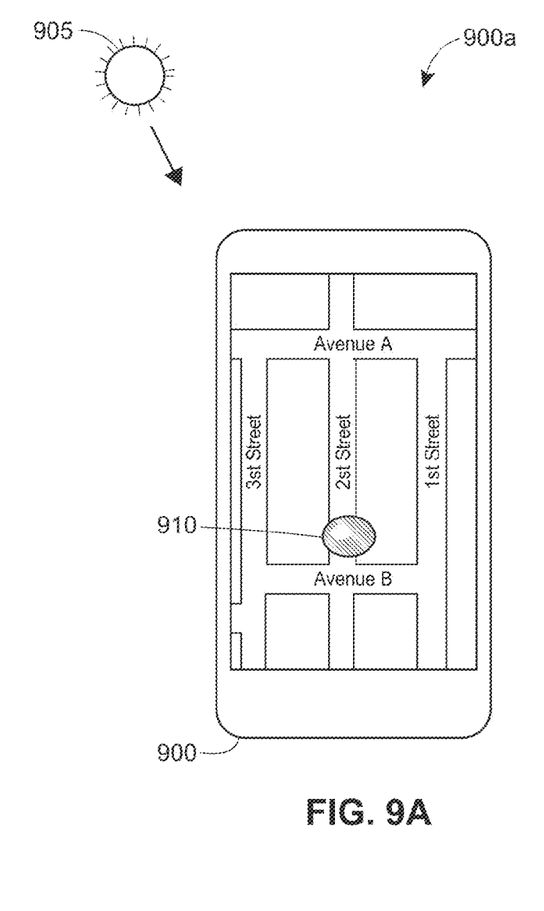
FIGS. 9A and 9B illustrate shadows generated for another 3D icon.
Figure 9B:
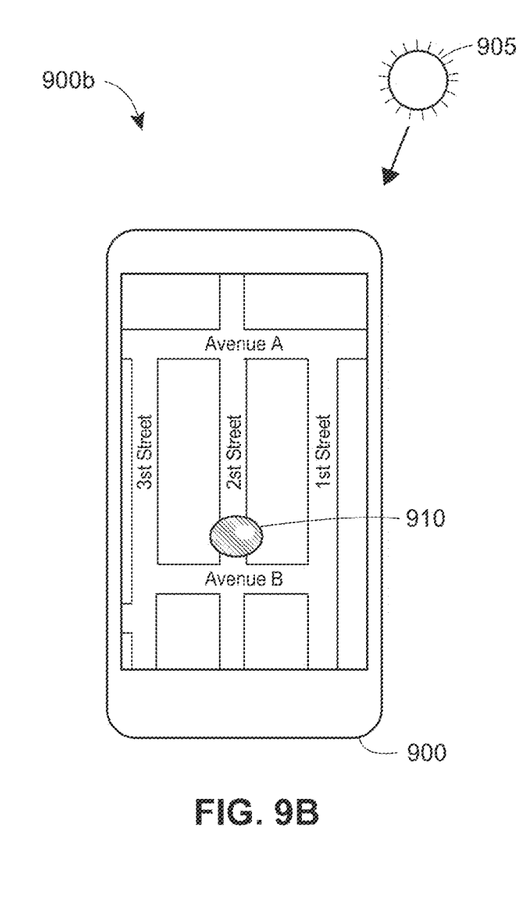

Finally, FIGS. 9a and 9b illustrate an orientation 900a and an orientation 900b, relative to a real-world sun 905, of a portable device 900 displaying an icon 910. In both FIGS. 9a and 9b, the icon 905 includes a glare spot corresponding to the position of the real-world sun 905.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

The term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as an SaaS. For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs for lighting graphical objects in view of environmental conditions through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A method for providing realistic lighting conditions for graphical representations depicted on portable devices, the method comprising:
    generating, by one or more processors, a graphical representation of a real-world object depicted on a map for display on a portable device, the graphical representation being lit by a virtual sun, the real-world object's orientation relative to the real-world sun being such that a real-world shadow cast by the real-world object would be directed in a real-world direction;
    determining, by the one or more processors, a current orientation of the portable device relative to the real-world sun, the current orientation of the portable device being such that the graphical representation's orientation relative to the real-world sun is different from the real-world object's orientation relative to the real-world sun;
    positioning, by the one or more processors in real-time, the virtual sun using the determined current orientation so that the graphical representation of the object, the virtual sun, and the real-world sun are positioned on a same imaginary line such that the graphical representation's orientation relative to the virtual sun matches the graphical representation's orientation relative to the real-world sun; and
    generating, by the one or more processors, a graphical shadow cast by the graphical representation based on the graphical representation's orientation relative to the virtual sun, whereby the graphical shadow is generated to create an appearance that the graphical representation is obstructing light from the real-world sun when the graphical representation's orientation relative to the real-world sun differs from the real-world object's orientation relative to the real-world sun such that the graphical shadow cast by the graphical representation is cast in a map direction different from the real-world direction in which the real-world shadow would be directed.

2. The method of claim 1, wherein the graphical representation of the real-world object is one of:
    (i) a graphical representation of a man-made structure;
    (ii) a graphical representation of a natural formation;
    (iii) a graphical representation of a geographic marker; or
    (iv) a graphical representation of an icon.

3. The method of claim 1, wherein determining the current orientation of the portable device relative to the real-world sun includes using one or more of:
    (i) current time;
    (ii) current date; and
    (iii) current geographic location of the portable device.

4. The method of claim 1, wherein determining the current orientation of the portable device relative to the real-world sun further comprises determining an orientation of the portable device relative to magnetic north.

5. The method of claim 4, wherein determining the current orientation of the portable device relative to the real-world sun further comprises determining at least one of:
    (i) a roll of the portable device; and
    (ii) a pitch of the portable device.

6. The method of claim 1, wherein generating the graphical shadow cast by the graphical representation based on the graphical representation's orientation relative to the virtual sun includes:
    determining a size of the shadow based on the current orientation of the graphical representation relative to the virtual sun.

7. The method of claim 1, further comprising:
    receiving an indication of current weather conditions at a geographic location where the portable device is located;
    determining a set of light parameters including one or more of (i) light temperature, (ii) light intensity, and (iii) light availability based on the current weather conditions; and
    lighting the digital map in accordance with the determined set of light parameters.

8. The method of claim 7, wherein generating the graphical shadow cast by the graphical representation includes adjusting thickness of the shadow based on the determined set of light parameters.

9. A non-transitory computer-readable medium storing thereon instructions that, when executed on one or more processors, cause the one or more processors to:
    determine a current orientation of a portable device relative to a real-world light source; and
    generate a digital map including graphical representations of real-world objects for display on the portable device, the graphical representations' orientation relative to the real-world light source differing from the real-world objects' orientation relative to the real-world light source, wherein generate the digital map includes:
    (i) based on the determined current orientation of the portable device relative to the real-world light source, position a virtual light source for the digital map at a first position so that the virtual light source is positioned on an imaginary line extending from the graphical representations to the real-world light source; and
    (ii) apply lighting to the graphical representations in accordance with a current orientation of the graphical representations relative to the position of the virtual light source, whereby the lighting is applied to create an appearance that the graphical representations in the digital map are lit by the real-world light source when the graphical representations' orientation relative to the real-world light source differs from the real-world objects' orientation relative to the real-world light source such that the graphical representations appear to be lit from a map direction that differs from a real-world direction from which the real-world objects appear to be lit.

10. The non-transitory computer-readable medium of claim 9, wherein the real-world objects include buildings.

11. The non-transitory computer-readable medium of claim 9, wherein the real-world light source is the sun, and wherein the instructions cause the portable device to determine the current orientation of the portable device relative to the real-world sun using one or more of:
(i) current time,
(ii) current date,
(iii) current geographic location of the portable device.

12. The non-transitory computer-readable medium of claim 9, wherein the instructions further cause the portable device to:
receive an indication of weather conditions at a geographic location where the portable device is located, and
apply lighting to the graphical representations in view of the weather conditions.

13. The non-transitory computer-readable medium of claim 9, wherein to apply lighting to the graphical representations, the instructions cause the portable device to:
generate shadows of the graphical representations for display on the portable device, including determine sizes of shadows in accordance with the current orientation of the portable device relative to the real-world light source.

14. A portable device comprising:
a display device;
one or more processors; and
a computer-readable memory storing thereon instructions that, when executed on the one or more processors, cause the portable device to:
determine an orientation of the portable device relative to the real-world sun, wherein the orientation is associated with six degrees of freedom (DOF),
generate a digital map depicting graphical representations of real-world objects for display on the display device, the graphical representations' orientation relative to the real-world sun differing from the real-world objects' orientation relative to the real-world sun,
based on the determined orientation of the portable device relative to the real-world sun, position a virtual sun for the digital map at a first position so that the virtual sun is positioned on an imaginary line extending from the graphical representations to the real-world sun; and
generate lighting effects for the digital map for display on the display device according to an orientation of the graphical representations relative to the position of the virtual sun, whereby the lighting effects are generated to create an appearance that the graphical representations depicted on the digital map are lit by the real-world sun when the graphical representation's orientation relative to the real-world sun differs from the real-world object's orientation relative to the real-world sun such that the graphical representations appear to be lit from a map direction that differs from a real-world direction from which the real-world objects appear to be lit.

15. The portable device of claim 14, further comprising a motion sensor to determine the orientation of the portable device relative to the real-world sun.

16. The portable device of claim 14, further comprising:
an environmental sensor to obtain ambient weather parameters, wherein the instructions further cause the portable device to generate the shadows in view of the weather parameters.

17. The portable device of claim 16, wherein the instructions cause the portable device to adjust at least one of (i) size, (ii) thickness, and (iii) color of the shadows based on the obtained weather parameters.

18. The portable device of claim 14, wherein the instructions cause the portable device to determine the current orientation of the portable device relative to the sun using one or more of:
(i) current time,
(ii) current date,
(iii) current geographic location of the portable device.

* * * * *